US012144357B2

(12) United States Patent
Roos et al.

(10) Patent No.: US 12,144,357 B2
(45) Date of Patent: Nov. 19, 2024

(54) RESTRAINT APPARATUS AND METHOD FOR STABILIZING A SUSPENDED CARCASS AND SKINNING MACHINE

(71) Applicant: Marel Brasil Comercial e Industrial LTDA, Guaporé (BR)

(72) Inventors: Henrique Dal Corso Becker Herbstrith Roos, Guaporé (BR); Eder Brambatti, Guaporé (BR); Giovani Sordi, Guaporé (BR); Tobias Damo Zandona, Guaporé (BR)

(73) Assignee: MAREL BRASIL COMERCIAL E INDUSTRIAL LTDA, Guapore (BR)

( * ) Notice: Subject to any disclaimer, the term of this patent is extended or adjusted under 35 U.S.C. 154(b) by 106 days.

(21) Appl. No.: 18/183,550

(22) Filed: Mar. 14, 2023

(65) Prior Publication Data

US 2023/0284637 A1  Sep. 14, 2023

(30) Foreign Application Priority Data

Mar. 14, 2022  (BR) .......................... 102022004626.3

(51) Int. Cl.
*A22B 7/00*  (2006.01)

(52) U.S. Cl.
CPC .................................. *A22B 7/003* (2013.01)

(58) Field of Classification Search
CPC .................................. A22B 7/003; A22B 5/06
USPC ......................................... 452/125, 127–130
See application file for complete search history.

(56) References Cited

U.S. PATENT DOCUMENTS

| | | | |
|---|---|---|---|
| 3,046,597 A | 7/1962 | Macy et al. | |
| 3,599,277 A | 8/1971 | Brown | |
| 3,789,458 A | 2/1974 | Brown | |
| 4,376,326 A * | 3/1983 | Noroy | A22B 5/161 452/125 |
| 4,438,546 A | 3/1984 | Couture | |
| 4,727,623 A * | 3/1988 | Durand | A22B 5/16 452/195 |
| 5,626,515 A * | 5/1997 | Krogh | A22B 5/0017 452/160 |
| 6,899,613 B2 * | 5/2005 | van den Nieuwelaar | A22C 21/0053 452/65 |
| 7,059,955 B2 * | 6/2006 | Green | B66C 23/04 452/189 |
| 7,625,369 B2 * | 12/2009 | Abboud | A61B 18/02 606/23 |
| 9,781,939 B2 * | 10/2017 | Koster | A22B 5/0041 |
| 2009/0143001 A1 * | 6/2009 | Godwin | A22B 5/06 452/187 |
| 2011/0111682 A1 * | 5/2011 | Schimitzek | A22B 7/003 452/187 |

FOREIGN PATENT DOCUMENTS

FR   2613587 B1   2/1993

* cited by examiner

*Primary Examiner* — Richard T Price, Jr.
(74) *Attorney, Agent, or Firm* — Workman Nydegger (57) ABSTRACT

A restraint apparatus is provided for stabilizing a suspended carcass having a head and a neck. The restraint apparatus includes a supporting structure, a mobile arm relative to the supporting structure, and a restraint device fastened on the arm. The restraint device has restraining means configured to, in use, exert a first contact with the head and a second contact with the neck, and a second contact exclusive with at least one part of the rear portion of the neck.

15 Claims, 12 Drawing Sheets

RESTRAINT APPARATUS AND METHOD FOR STABILIZING A SUSPENDED CARCASS AND SKINNING MACHINE

TECHNICAL FIELD

The present invention refers to a restraint apparatus and method for stabilizing a suspended carcass, and skinning machine used in a carcass processing line of slaughtered animals.

STATE OF THE ART

In the meat industry, animals are generally slaughtered in a bleeding process, which is carried out after a stage of stunning the animal, and consists of suspending the animal by the hooves and making a cut in a front portion of the neck of the animal. Subsequently, the suspended carcasses of the slaughtered animals are moved along a carcass processing line comprising various work stations, a respective processing stage being carried out at each work station. More specifically, the carcasses are suspended on an overhead conveyor by way of suspension means configured to suspend the carcasses by at least one hoof, the overhead conveyor being configured to move the carcasses along the processing line.

In some processing stages of the carcass processing line, it is necessary to stabilize the suspended carcass to enable an operation to be performed on the carcass. For example, in one of the processing stages, the carcass is subjected to a skinning process in the back region, so that the stages of total removal of the hide can be carried out and different parts of the carcass can be cut. Usually, the back skinning process is finalized by means of a skinning machine comprising an extractor arm. In operation, the extractor arm engages a portion of hide partially removed from the back and makes an upward movement to remove a remaining portion of hide present on the back of the carcass. Therefore, it is necessary to stabilize the suspended carcass to enable the extractor arm to perform the operation of removing the hide.

One way of stabilizing a suspended carcass consists of using a restraint apparatus, which is generally cooperative with another apparatus configured to perform an operation on the carcass, such as, for example, a skinning machine used to perform the operation of removing the hide present on the back of the carcass. A conventional restraint apparatus comprises a supporting structure, a mobile arm relative to the supporting structure and a restraint device fastened on the arm.

Particularly, in operation, the arm of the conventional restraint apparatus remains in a rest position until the arrival of a suspended carcass. When the carcass being transported on the overhead conveyor aligns with the arm, the arm moves to a working position, making the restraint device press a front portion of the neck of the carcass, pushing the head against a bulkhead, so as to stabilize the carcass, while another apparatus cooperative with the conventional restraint apparatus performs an operation on the carcass. Once the operation has been performed, the arm of the conventional restraint apparatus returns to the rest position, until the arrival of a new suspended carcass.

However, the conventional carcass restraint apparatus has drawbacks related to potential contamination of the carcasses. Owing to the fact that the restraint device of the conventional restraint apparatus presses the front portion of the neck of the carcass, the restraint device comes into direct contact with the inner part of the neck exposed by the cut made in the bleeding process. In the event that a carcass is contaminated, the restraint device of the conventional restraint apparatus may transmit contaminated blood from this carcass to the other carcasses, causing a problem of cross contamination.

SUMMARY OF THE INVENTION

With a view to solving the drawbacks present in the state of the art, the present invention proposes a restraint apparatus for stabilizing a suspended carcass, the restraint apparatus comprising a supporting structure, a mobile arm relative to the supporting structure and a restraint device fastened on the arm. According to the invention, the restraint device comprises restraining means configured to, in use, exert a first contact with the head and a second contact with the neck, the second contact being exclusive with at least one part of a rear portion of the neck.

Accordingly, advantageously, the restraint device of the restraint apparatus exerts contact only on the head and on the rear portion of the neck, so as not to come into contact with the front portion of the neck, and consequently, with the inner part of the neck exposed by the cut made in the bleeding process, whereby preventing potential problems of cross contamination between carcasses.

The invention also proposes a method for stabilizing a suspended carcass, the method including a stage of applying a restraint device having restraining means to exert a first contact with the head and a second contact with the neck, the second contact being exerted exclusively with at least one part of the rear portion of the neck.

The invention also proposes a skinning machine that comprises a restraint apparatus for stabilizing a suspended carcass, the restraint apparatus being configured as proposed by the invention.

BRIEF DESCRIPTION OF THE DRAWINGS

The invention will be better understood through the detailed description below, which will be better interpreted with the assistance of the drawings, wherein.

DETAILED DESCRIPTION

Figure 7:
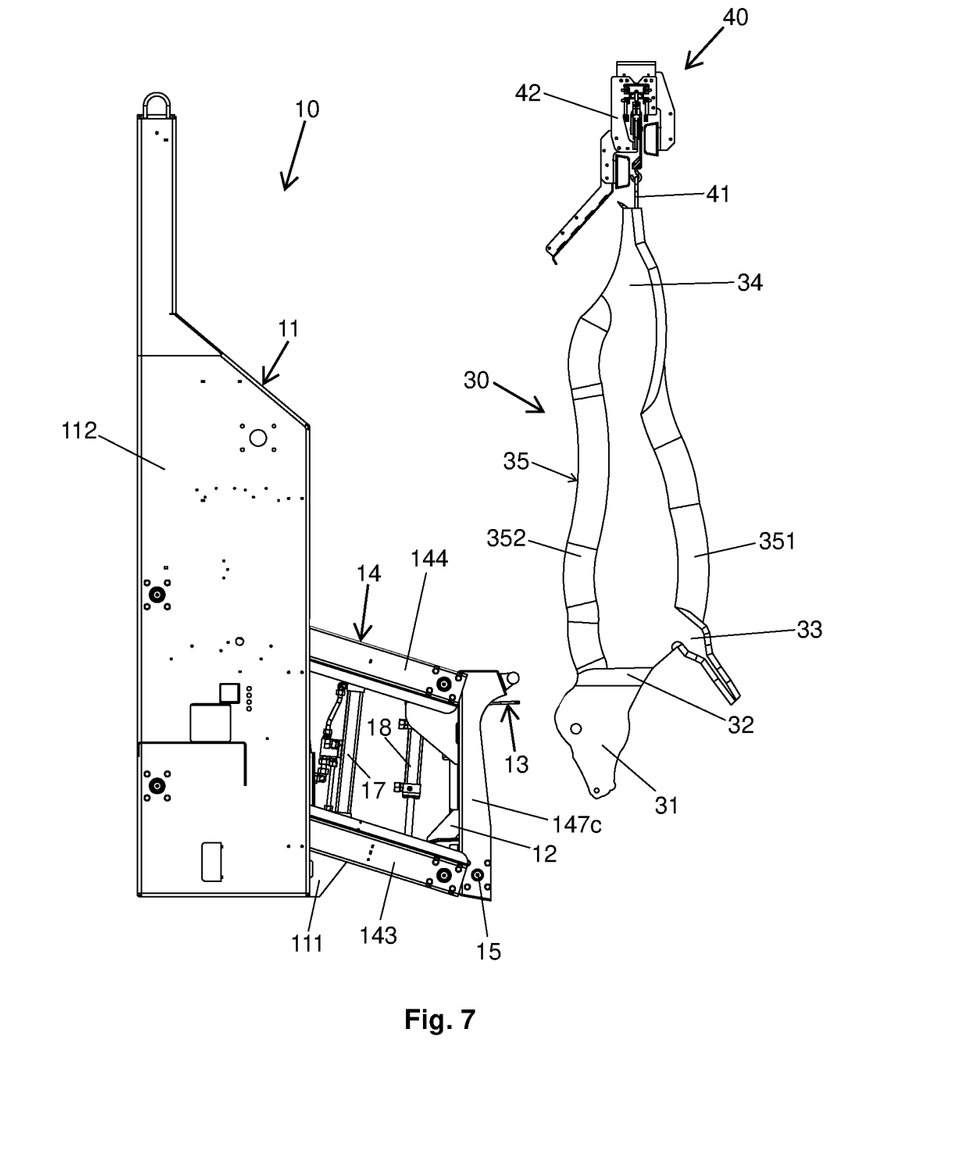
FIG. 7 presents a side view of the restraint apparatus jointly with an overhead conveyor, wherein an arm is in a first height position and the restraint device is in rest position.
Figure 8:
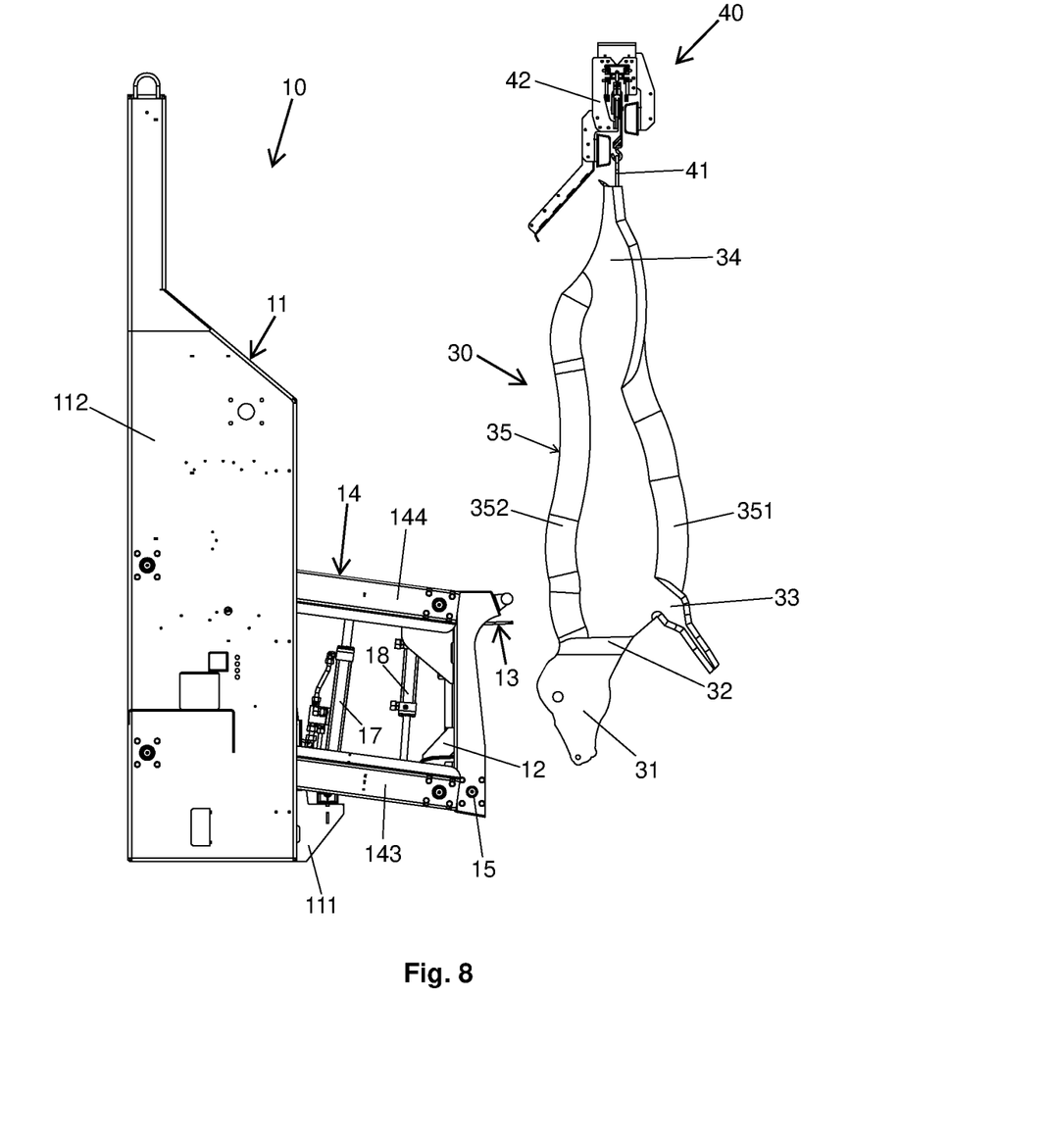
FIG. 8 presents a side view of the restraint apparatus jointly with the overhead conveyor, wherein the arm is in a second height position and the restraint device is in rest position.
Figure 9:
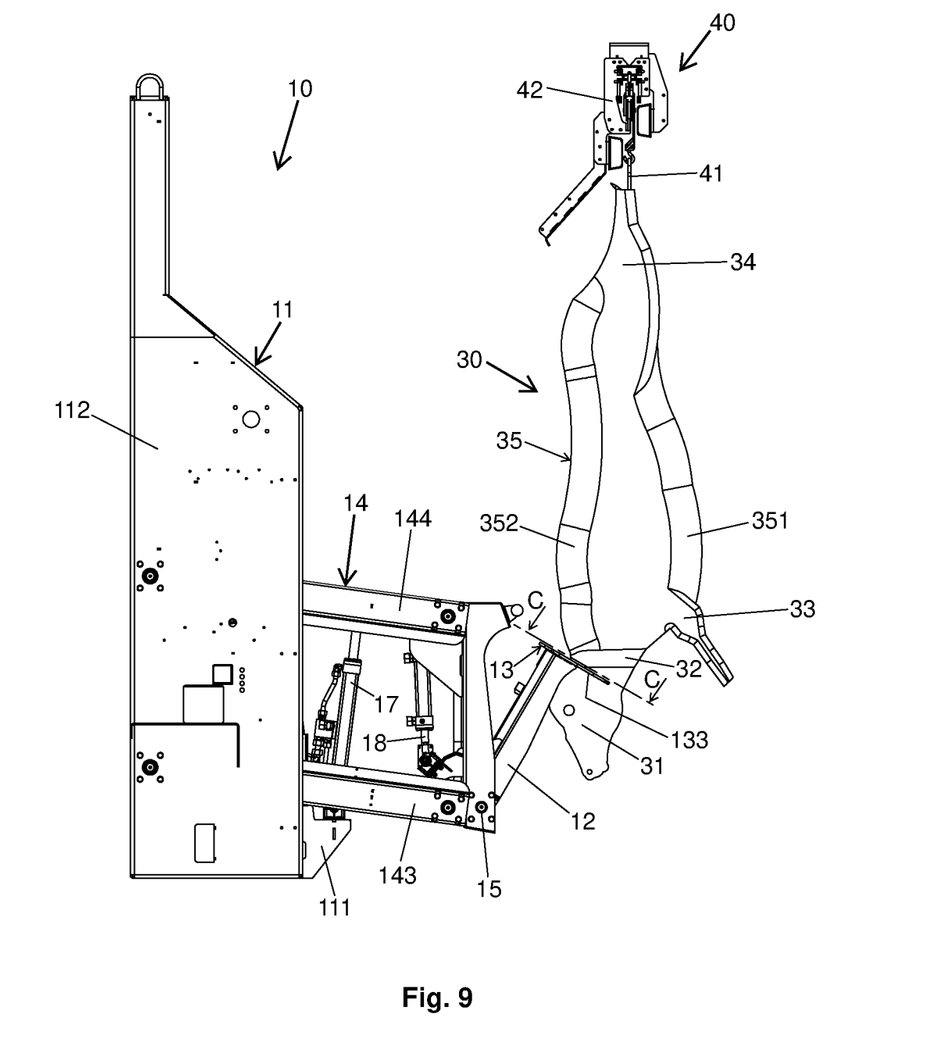
FIG. 9 presents a side view of the restraint apparatus jointly with the overhead conveyor, wherein the arm is in the second height position and the restraint device is in working position.

As can be seen in FIGS. 7 to 9, a carcass (30) of a slaughtered animal, such as, for example, a bovine, comprises a head (31), a neck (32) and a trunk (35), including brisket (351) and back (352). Front hooves (33) and rear hooves (34) project from the trunk (35). The neck (32) comprises a peripheral region that is divided into a front portion (32*a*) and a rear portion (32*b*). In the context of the invention, the neck (32) is divided according to a coronal plane, as represented by the line D-D illustrated in FIG. 10, and the front portion (32*a*) of the neck (32) corresponds to one half of the peripheral region of the neck (32) which extends in a manner substantially parallel to the brisket (351) of the carcass (30), while the rear portion (32*b*) of the neck (32) corresponds to the other half of the peripheral region of the neck (32) which extends in a manner substantially parallel to the back (352) of the carcass (30).

In a carcass processing line (30) of slaughtered animals, the carcasses (30) are suspended on an overhead conveyor (40) by way of suspension means (41), the overhead conveyor (40) being configured to move the carcasses (30) along the processing line, the processing line being comprised of a plurality of work stations where the respective processing stages are carried out.

In the manner already known in the state of the art, and as can be seen in FIGS. 7 to 9, the overhead conveyor (40) comprises a track (42) that extends along the work stations of the processing line, the overhead conveyor (40) being driven by means of a drive motor. The suspension means (41) run on the track (42) of the overhead conveyor (40) by means of trolleys driven by the drive motor. The suspension means (41) can be of the hook, shackle or chain type, and are configured to secure the carcass (30) by at least one rear hoof (34). Preferably, the two rear hooves (34) of the carcass (30) are restrained in the suspension means (41). Thus, in suspended position on the overhead conveyor (40), each carcass (30) is oriented vertically with the rear hooves (34) in upper position and the head (31) in lower position. Further, a certain carcass (30) is spaced relative to the adjacent carcasses (30) suspended on the overhead conveyor (40).

In some processing stages of the processing line, it is necessary to stabilize the suspended carcass (30), in order to enable an operation to be performed on the carcass (30). As can be seen in FIGS. 1 to 12, the present invention proposes a restraint apparatus (10) for stabilizing a suspended carcass (30), the restraint apparatus (10) comprising a supporting structure (11), a mobile arm (12) relative to the supporting structure (11) and a restraint device (13) fastened on the arm (12). According to the invention, the restraint device (13) comprises restraining means (130) configured to, in use, exert a first contact with the head (31) and a second contact with the neck (32), the second contact being exclusive with at least one part of the rear portion (32*b*) of the neck (32), as can be seen better in FIGS. 9 and 10.

Accordingly, advantageously, the restraint device (13) of the restraint apparatus (10) exerts contact only on the head (31) and on the rear portion (32*b*) of the neck (32), so as not to come into contact with the front portion (32*a*) of the neck (32), and consequently, with the inner part of the neck (32) exposed by the cut made in the bleeding process, whereby preventing potential problems of cross contamination between carcasses (30).

Figure 2:
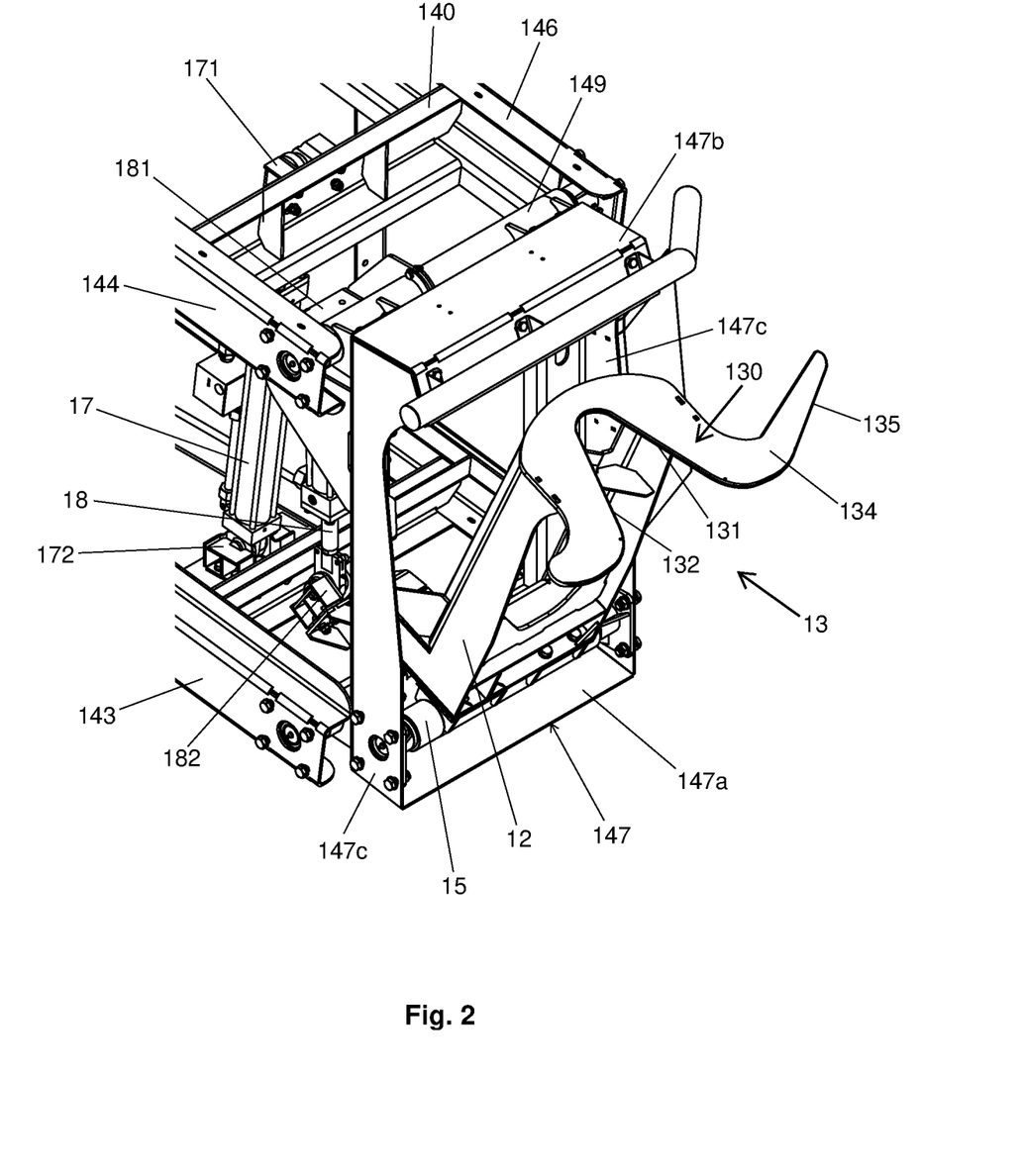
FIG. 2 presents a blown-up view of the region A indicated in FIG. 1.
Figure 10:
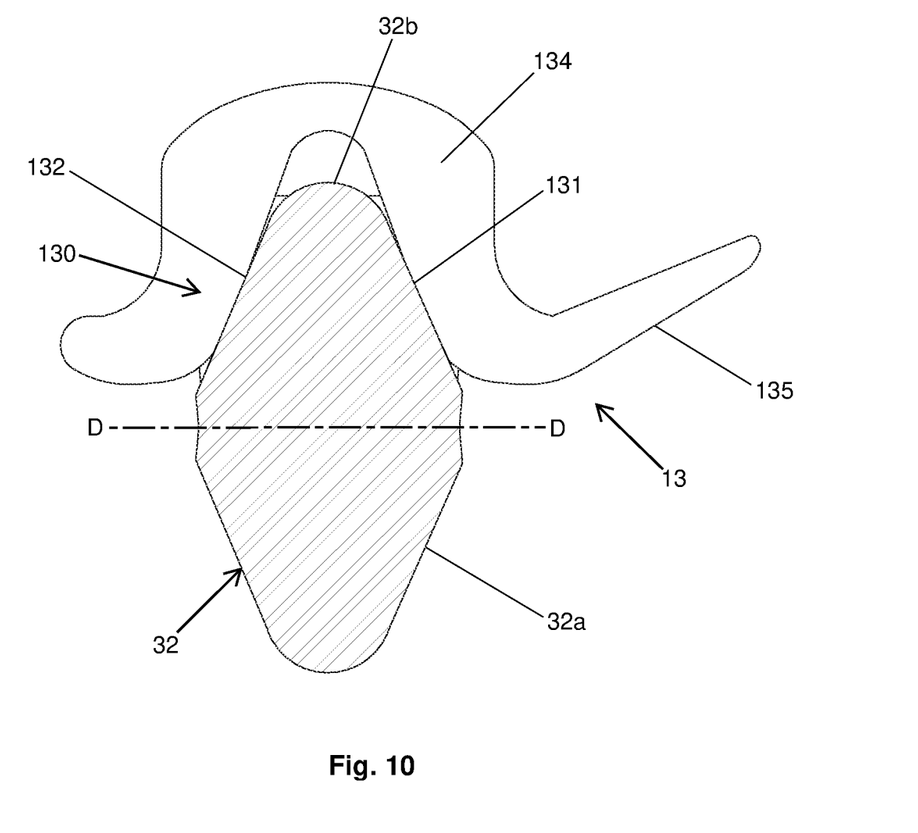
FIG. 10 presents a sectional schematic view according to the C-C sectional plane indicated in FIG. 9.
Figure 11:
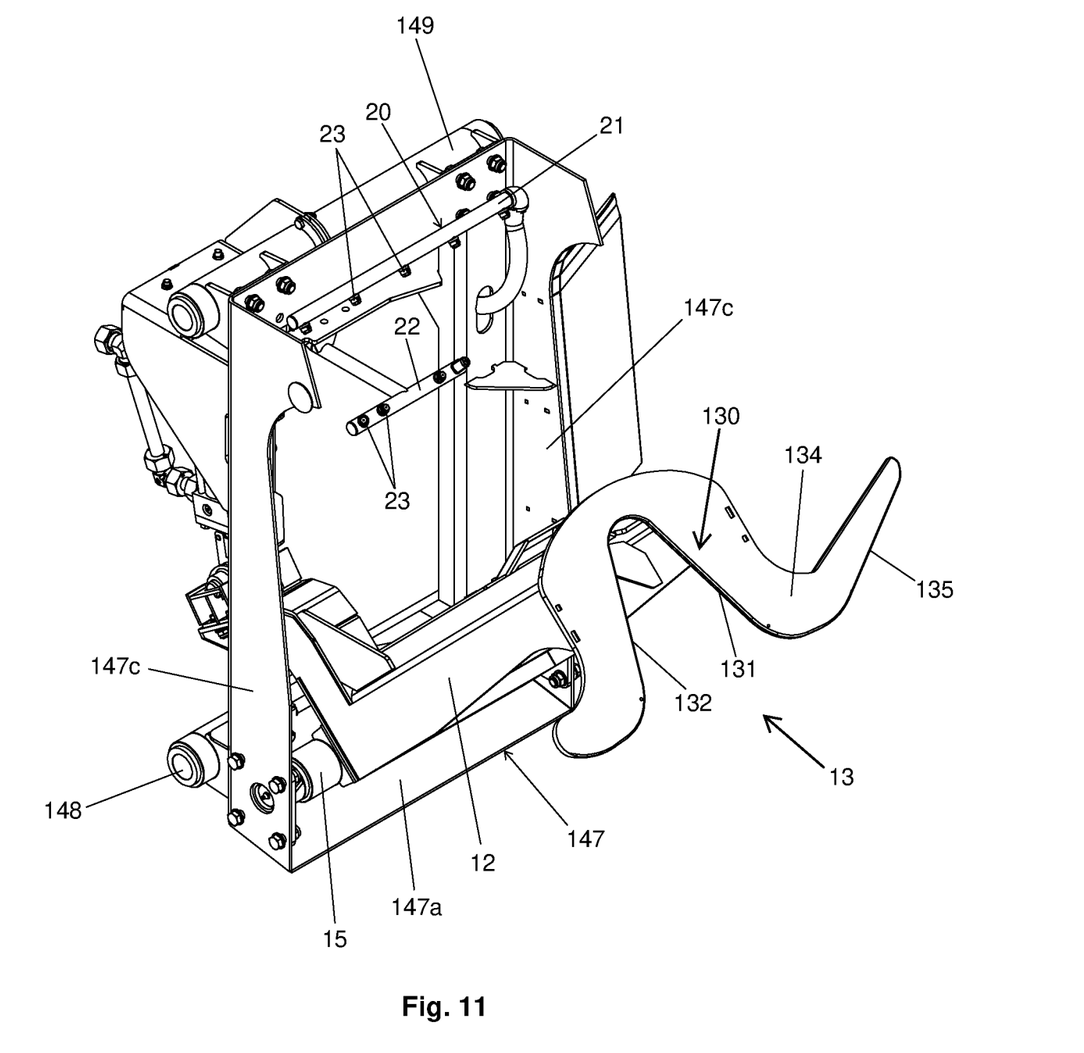
FIG. 11 presents a perspective view of the restraint device in working position, jointly with a supporting assembly, without representing an upper segment of the supporting assembly.

Preferably, as can be seen in FIGS. 2, 10 and 11, the restraining means (130) of the restraint device (13) comprise a first contact surface (131) and a second contact surface (132), the contact surfaces (131, 132) defining together an opening angle and being configured to exert the second contact with the neck (32) of the carcass (30). Preferably, the opening angle between the first contact surface (131) and the second contact surface (132) is comprised between 30° and 50°. Therefore, when the restraint device (13) acts on the carcass (30), the rear portion (32*b*) of the neck (32) is positioned between the contact surfaces (131, 132). It is noted that the opening between the contact surfaces (131, 132) contributes for them to distance themselves from the front portion (32*a*) of the neck (32), considering that the neck (32) of the carcass (30) is substantially circular in shape.

Preferably, the restraining means (130) of the restraint device (13) comprise a third contact surface (133) configured to exert the first contact with the head (31) of the carcass (30).

Preferably, as can be seen better in FIGS. 2, 5, 10 and 11, the restraint device (13) comprises a plate (134) fastened on the arm (12), the plate (134) having an edge, a bottom surface and a top surface, and the first and the second contact surfaces (131, 132) are defined by at least one part of the edge of the plate (134), and the third contact surface (133) is defined by at least one part of the bottom surface of the plate (134).

Preferably, the first contact surface (131) and the second contact surface (132) correspond, respectively, to a first leg and to a second leg of a V-shaped cut present on the plate (134). In the embodiment represented, the first leg and the second leg are joined together by a curved surface, which may also exert the second contact with the neck (32) of the carcass (30), depending on the thickness of the neck (32) of the carcass (30), which may vary from one animal to the next. Alternatively, the first leg and the second leg are joined together by a vertex.

Preferably, the restraint apparatus (10) comprises a guide surface (135) suitable for guiding the neck (32) towards the first and second contact surfaces (131, 132) of the restraint device (13). In the embodiment represented, as can be seen better in FIGS. 2, 10 and 11, the guide surface (135) is defined at the edge of the plate (134) and extends from the first contact surface (131), along a curved trajectory in the opposite direction to a direction of transport of the carcass (30) and in a direction approaching the carcass (30), followed by a straight trajectory in the opposite direction to the direction of transport of the carcass (30) and in a direction backing away from the carcass (30).

In the embodiment represented, the bottom surface of the plate (134) is welded on the arm (12). Alternatively, the plate (134) can be fastened on the arm (12) in other ways, such as, for example, by means of screws.

Preferably, the arm (12), in use, develops a movement between a rest position, such as, for example, illustrated in FIG. 8, on which the restraint device (13) is distanced from of the carcass (30), and a working position, such as, for example, illustrated in FIG. 9, on which the restraint device (13) is operative on the carcass (30). Preferably, the movement of the arm (12) from the rest position to the working position is carried out so as to result in a downward movement on the restraint device (13).

Preferably, the arm (12) is articulated around an articulation axis (15). Preferably, the arm (12) is articulated by actuation of an articulation cylinder (18). The actuation of the articulation cylinder (18) moves the arm (12) between the rest position and the working position.

In the embodiment represented, as can be seen in FIG. 9, when the arm (12) is moved to the working position, the plate (134) of the restraint device (13) is positioned with a slant relative to a horizontal plane. When an apparatus that is cooperative with the restraint apparatus (10) applies an upward force on the carcass (30), such as, for example, occurs in a skinning machine, the carcass (30) will remain firmly restrained by the restraint device (13). An upward force applied to the carcass (30) is offset by the first contact with the head (31) of the carcass (30) exerted by the third contact surface (133) of the restraint device (13), and by the second contact with the neck (32) of the carcass (30) exerted by the first and second contact surfaces (131, 132) of the restraint device (13). Thus, the carcass (30) is kept stabilized in the suspended position in a manner suitable for carrying out an operation on the carcass (30).

Figure 3:
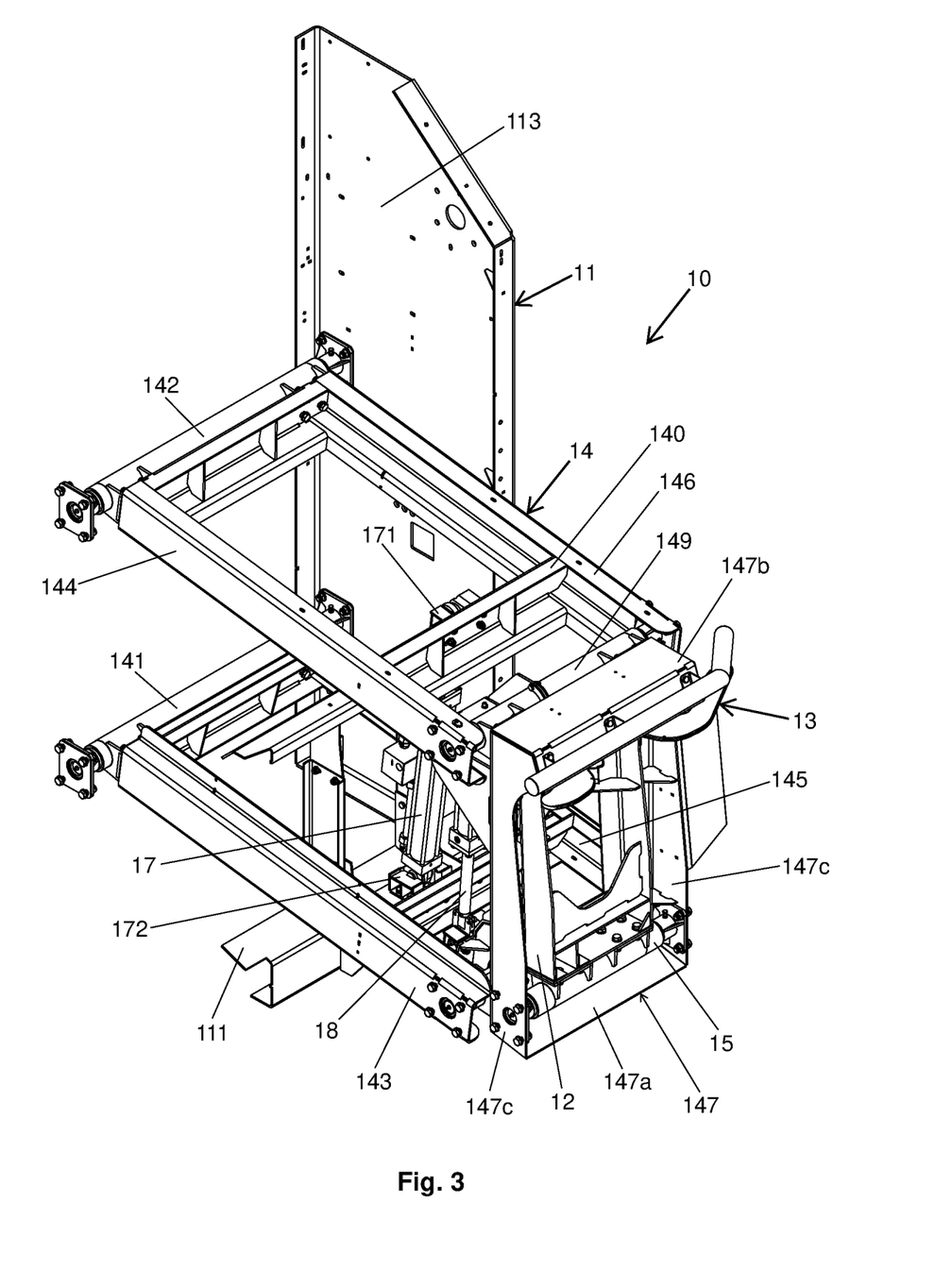
FIG. 3 presents a perspective view of the restraint apparatus, without representing a first side wall of a supporting structure, and with the restraint device in rest position.
Figure 4:
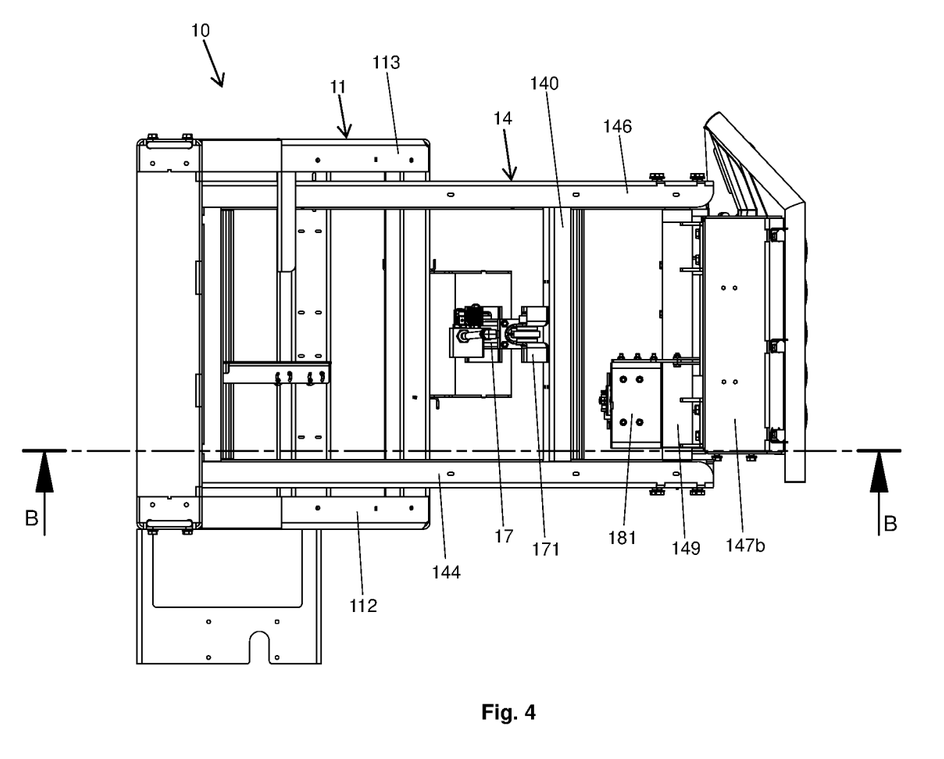
FIG. 4 presents a top view of the restraint apparatus, wherein the restraint device is in rest position.

Preferably, the arm (12) is fastened on a movement assembly (14) fastened on the supporting structure (11), the arm (12) having adjustable height relative to the supporting structure (11). In the embodiment represented, the arm (12) is fastened on a supporting assembly (147) present in the movement assembly (14), by means of the articulation axis (15) supported by bearings on the supporting assembly (147). More particularly, as can be seen in FIGS. 2 and 3, the supporting assembly (147) comprises a lower segment (147a) and an upper segment (147b), joined together by side segments (147c), so as to form a structure in tabular format. More particularly, the articulation axis (15) is formed by a tube fastened on a lower end of the arm (12), the tube having tips coupled in bearings fastened on the side segments (147c) of the supporting assembly (147).

Figure 1:
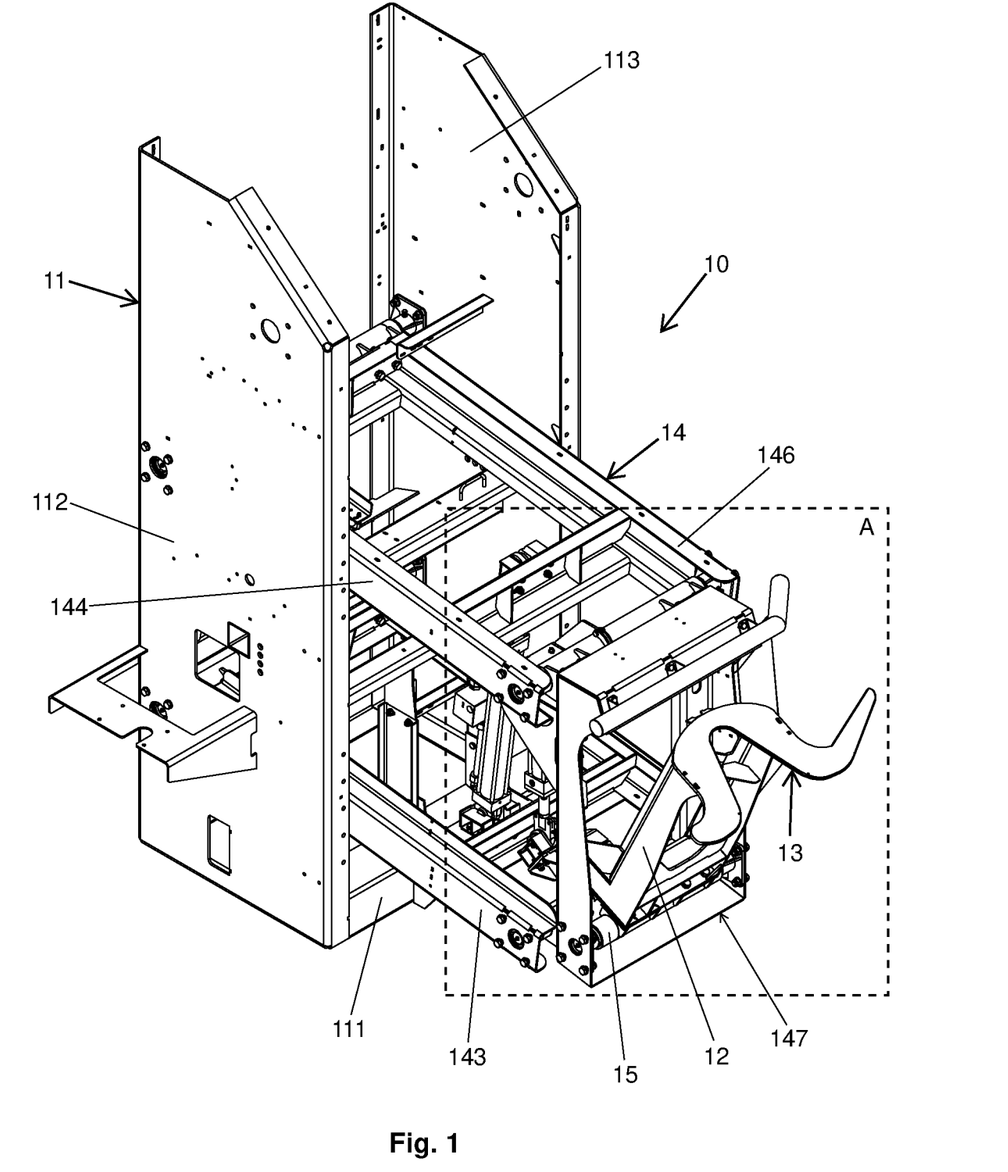
FIG. 1 presents a perspective view of a restraint apparatus according to the invention, wherein a restraint device is in working position.

In the embodiment represented, as can be seen in FIG. 1, the supporting structure (11) comprises a base (111) cooperative with a first side wall (112) and with a second side wall (113).

In the embodiment represented, as can be seen in FIGS. 1 to 6, the movement assembly (14) comprises a first lower bar (143) and a second lower bar (145), each lower bar (143, 145) being fastened on a respective end of a lower rear tube (141), the lower rear tube (141) having one side supported by bearings on the first side wall (112) of the supporting structure (11) and the opposite side supported by bearings on the second side wall (113) of the supporting structure (11).

Additionally, in the embodiment represented, the movement assembly (14) comprises a first upper bar (144) and a second upper bar (146), each upper bar (144, 146) being fastened on a respective end of an upper rear tube (142), the upper rear tube (142) having one side supported by bearings on the first side wall (112) of the supporting structure (11) and the opposite side supported by bearings on the second side wall (113) of the supporting structure (11).

It is therefore noted that the lower bars (143, 145) of the movement assembly (14) are articulated relative to the supporting structure (11) by means of the rotation of the lower rear tube (141) relative to the respective bearings installed on the side walls (112, 113), while the upper bars (144, 146) are articulated relative to the supporting structure (11) by means of the rotation of the upper rear tube (142) relative to the respective bearings installed on the side walls (112, 113).

Additionally, in the embodiment represented, the supporting assembly (147) is fastened on a lower front tube (148), which has a side supported by bearings on the first lower bar (143) and the opposite side supported by bearings on the second lower bar (145). Additionally, the supporting assembly (147) is fastened on an upper front tube (149), which has a side supported by bearings on the first upper bar (144) and the opposite side supported by bearings on the second upper bar (146).

It is therefore noted that the supporting assembly (147) is articulated relative to the lower bars (143, 145) by means of the rotation of the lower front tube (148) relative to the respective bearings installed on the lower bars (143, 145), and the supporting assembly (147) is articulated relative to the upper bars (144, 146) by means of the rotation of the upper front tube (149) relative to the respective bearings installed on the upper bars (144, 146). Thus, a combined motion of the bars (143, 144, 145, 146) of the movement assembly (14) enables the adjustment of the height of the supporting assembly (147), and consequently of the arm (12), relative to the supporting structure (11), and, therefore, adjustment of the height of the restraint device (13) relative to the suspended carcass (30) on the overhead conveyor (40).

Figure 5:
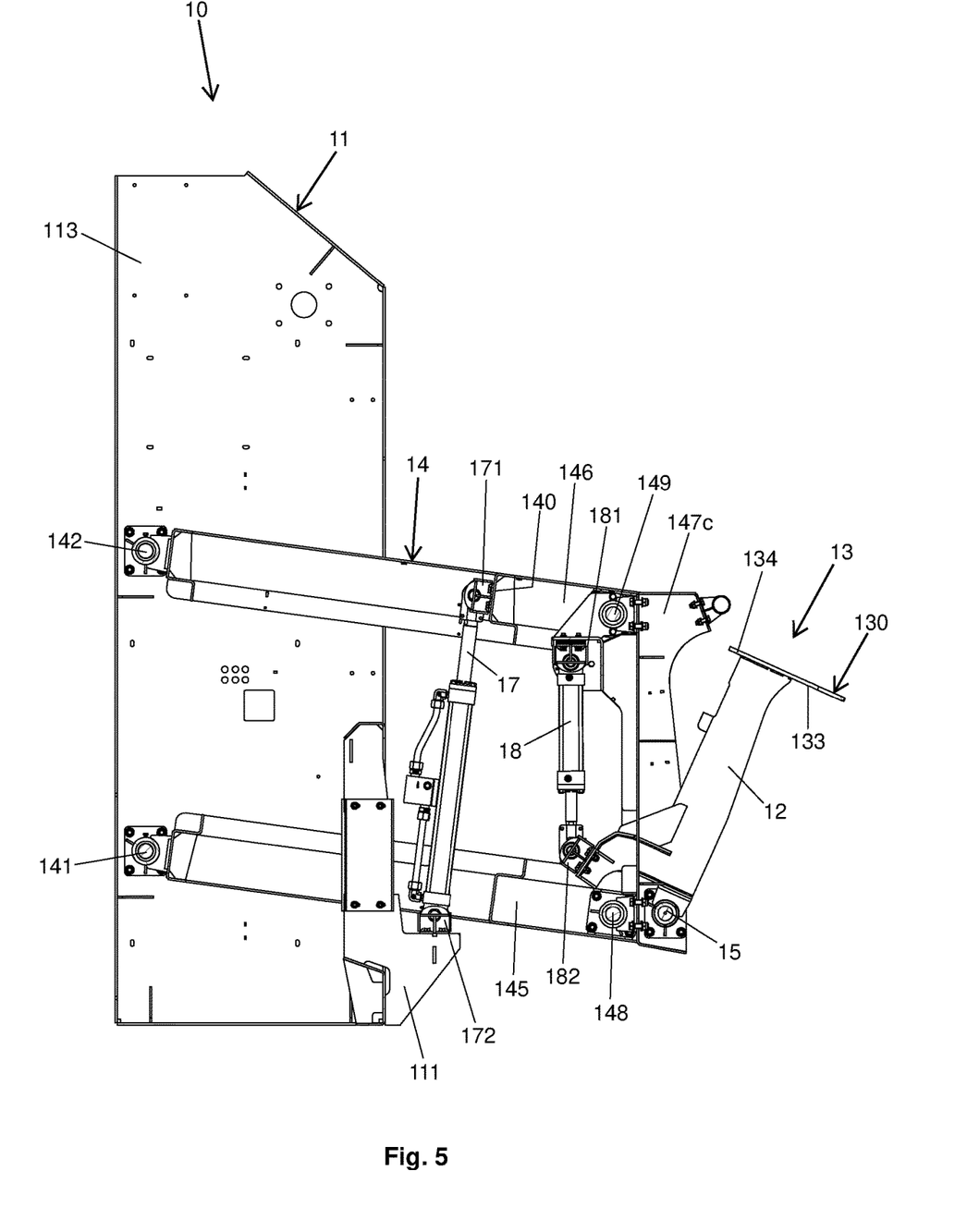
FIG. 5 presents a cross-sectional view according to the B-B sectional plane indicated in FIG. 4, but with the restraint device in working position.
Figure 6:
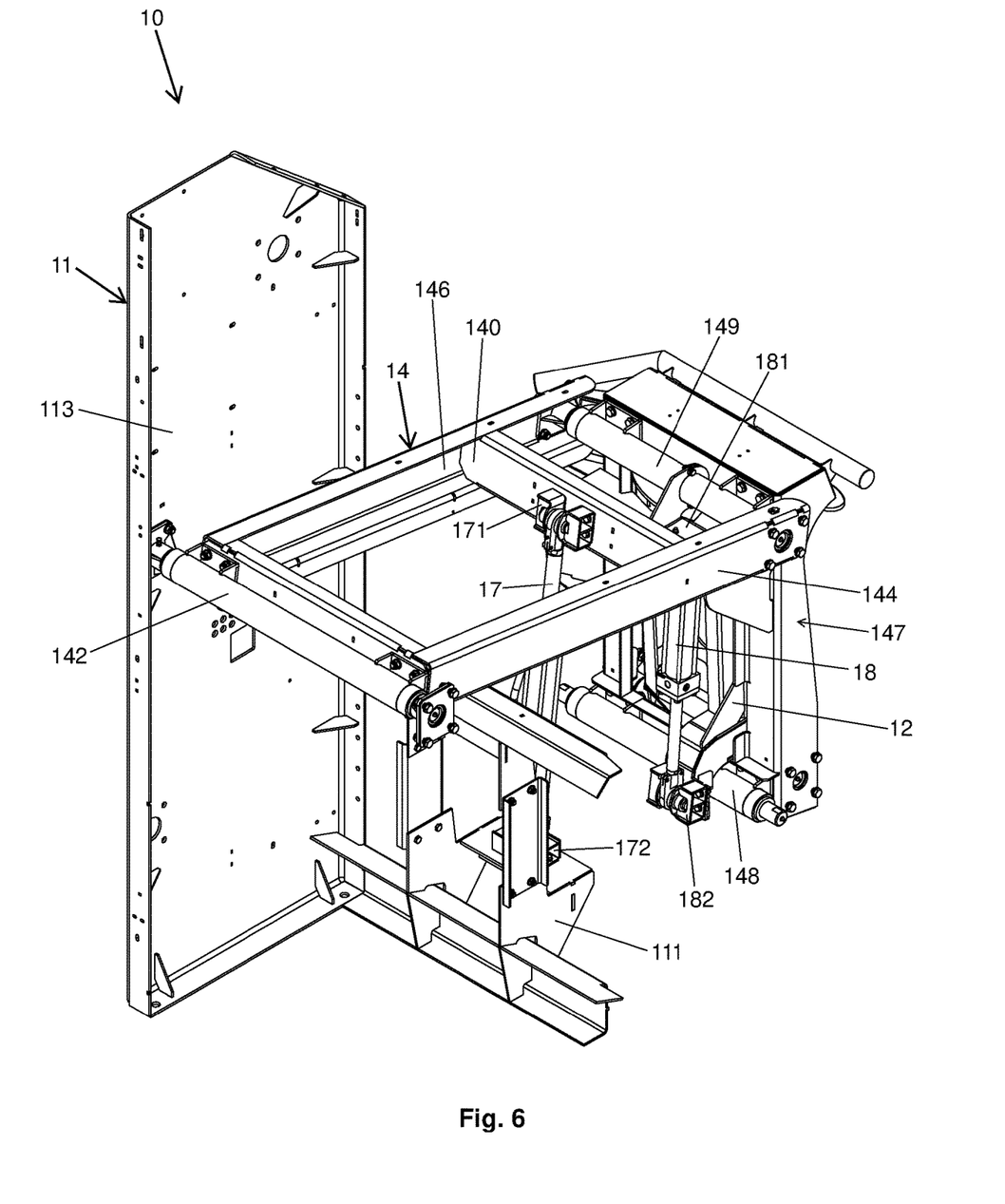
FIG. 6 presents a perspective view of the restraint apparatus, without representing the first side wall, and without representing a pair of lower bars and a lower rear tube of a movement assembly.

In the embodiment represented, as can be seen better in FIGS. 3, 5 and 6, the movement assembly (14) is articulated relative to the supporting structure (11) by actuation of a movement cylinder (17). More specifically, the movement cylinder (17) has a lower end fastened at a lower fastening point (172) present at the base (111) of the supporting structure (11) and an upper end fastened at an upper fastening point (171) present on a crosspiece (140) fastened on the upper bars (144, 146) of the movement assembly (14).

Thus, by driving the movement cylinder (17), the movement assembly (14) is articulated relative to the supporting structure (11), so as to adjust the height of the arm (12) relative to the supporting structure (11) between a lower travel stop position and an upper travel stop position, for example, determined by the path of the rod of the movement cylinder (17).

More specifically, the height adjustment of the arm (12) can be carried out by an operator, from a control panel configured to command the actuation of the movement cylinder (17), the height of the arm (12) being adjustable according to the size of the carcass (30) to be restrained by the restraint device (13). Accordingly, the operator may correctly adjust the height of the restraint device (13) so that the first and the second contact surfaces (131, 132) of the restraint device (13) exert the second contact with the rear portion (32b) of the neck (32) of the carcass (30), and so that the third contact surface (133) of the restraint device (13) exerts the first contact with the head (31) of the carcass (30). FIG. 7 illustrates the movement assembly (14) adjusted such that the arm (12) is at a first height position not suitable for the restraint device (13) to act on the carcass (30), while FIG. 8 illustrates the movement assembly (14) adjusted such that the arm (12) is at a second height position suitable for the restraint device (13) to act on the carcass (30).

In the embodiment represented, as can be seen better in FIGS. 2, 5 and 6, the articulation cylinder (18) comprises one end fastened at an upper fastening point (181) solidary to the supporting assembly (147) and an opposite end fastened at a lower fastening point (182) solidary to the arm (12). Accordingly, by driving the articulation cylinder (18), the arm (12) is articulated around the articulation axis (15). In the embodiment represented, the articulation cylinder (18) and the movement cylinder (17) are of the hydraulic cylinder type, and, alternatively, these cylinders (17, 18) may be replaced by another type of actuator, such as, for example, pneumatic cylinder or electric linear actuator.

In operation, the arm (12) of the restraint apparatus (10) remains in the rest position until the arrival of a suspended carcass (30) being transported on the overhead conveyor (40), the back (352) of the carcass (30) facing towards the restraint apparatus (10), as can be seen in FIG. 8. Upon nearing the restraint apparatus (10), the carcass (30) may contact and slide on the guide surface (135) of the restraint device (13), with the arm (12) still in rest position. When the carcass (30) aligns with the opening of the restraint device (13) of the restraint apparatus (10), the arm (12) moves to the working position, causing the restraint device (13) to exert the first contact with the head (31) and the second contact with the rear portion (32b) of the neck (32) of the carcass (30), as can be seen in FIGS. 9 and 10.

Preferably, the restraint apparatus (10) comprises at least one means of detecting the carcass (30) capable of initiating movement of the arm (12) when detecting the passage of a carcass (30). In the embodiment presented, the detection means is a sensor, for example, a contact sensor, installed on the overhead conveyor (40) to detect the passage of the suspension means (41) of the carcass (30).

More specifically, the detection means is cooperative with a programmable logic controller capable of managing the articulation cylinder (18) of the arm (12). Thus, when the detection means is driven by the passage of a carcass (30) being transported on the overhead conveyor (40), the articulation cylinder (18) is driven by the controller, causing the arm (12) to be moved from the rest position to the working position.

Additionally, the controller is configured, after a certain period of time, to drive again the articulation cylinder (18), so as to move the arm (12) from the working position to the rest position, releasing the carcass (30) to proceed along on the overhead conveyor (40). It is noted that the period of time that the arm (12) remains in the working position can be adjusted in the controller, according to the operation to be carried out on the carcass (30). Alternatively, the restraint apparatus (10) can be configured so that the movement of the arm (12) between the rest position and the working position is driven directly by an operator, by operating drive means present on a control panel.

Figure 12:
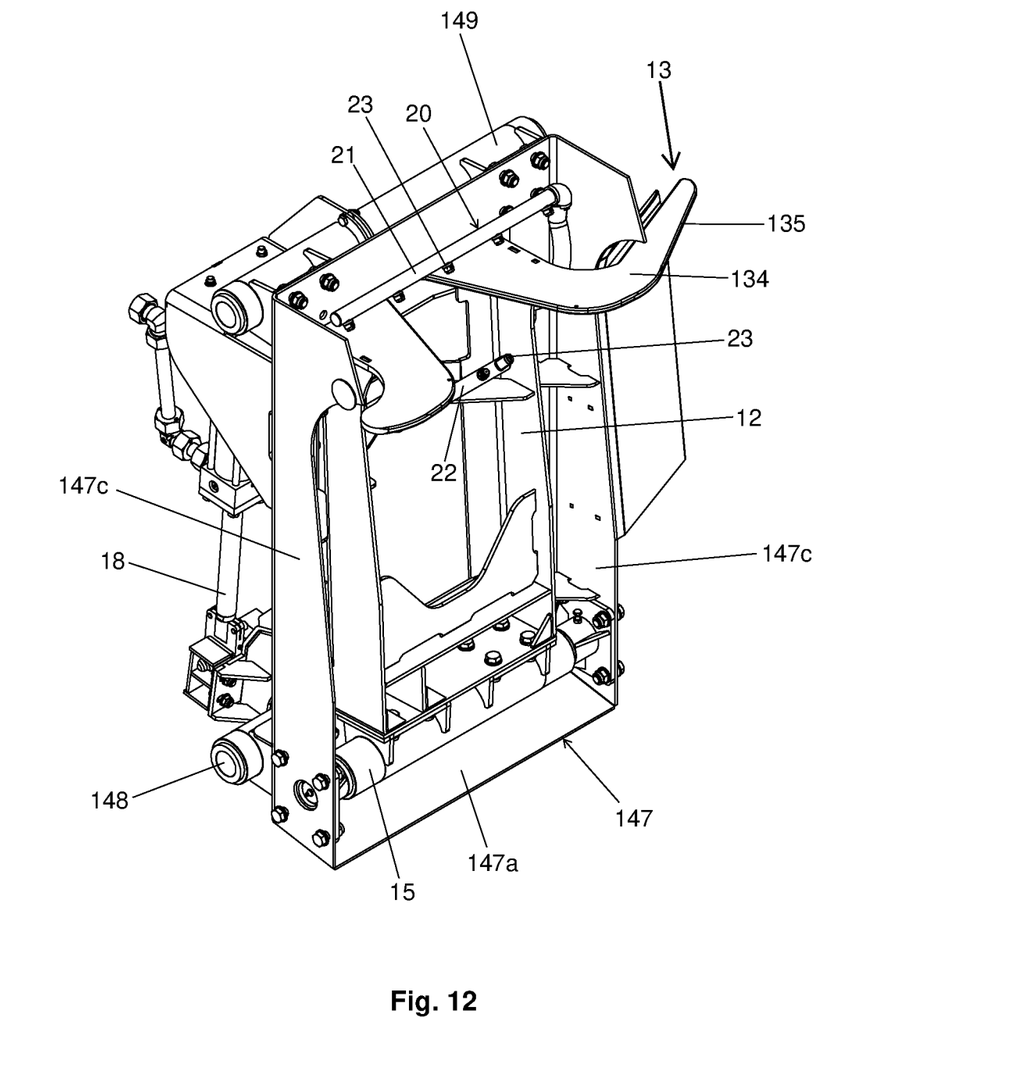
FIG. 12 presents a perspective view of the restraint device in rest position, jointly with the supporting assembly, without representing the upper segment of the supporting assembly.

Preferably, the restraint apparatus (10) comprises a cleaning assembly (20) having at least one water duct (21, 22) equipped with a plurality of spray nozzles (23) directed to spray water against the restraint device (13). Preferably, as can be seen in FIGS. 11 and 12, the cleaning assembly (20) has an upper water duct (21) equipped with a plurality of spray nozzles (23) directed to spray water against the top surface of the plate (134) of the restraint device (13), and a lower water duct (22) equipped with a plurality of spray nozzles (23) directed to spray water against the bottom surface of the plate (134) of the restraint device (13). The water ducts (21, 22) may be fed with hot water, from a feed point.

Preferably, the water pulverization is triggered when the restraint device (13) is in rest position, as can be seen in FIG. 12, once a carcass (30) has been restrained, with the aim of cleaning the restraint device (13) to receive a following carcass (30) from the processing line. For example, the cleaning assembly (20) may be equipped with at least an open and close valve to release a passage of water to the spray nozzles (23). For example, the act of opening the valve may be commanded by the programmable logic controller in a manner that is indexed to the return of the restraint device (13) from the working position to the rest position. Alternatively, the act of opening the valve may be carried out by an operator, from a control panel.

In an alternative embodiment not represented, the arm of the restraint apparatus can be slidably fastened along a slanted guide, such that the arm can move linearly between a rest position wherein the restraint device is away from the carcass, and a working position wherein the restraint device is operative on the carcass.

The invention also proposes a skinning machine that comprises a restraint apparatus (10) for stabilizing a suspended carcass (30), the restraint apparatus (10) being configured as proposed by the invention. For example, the supporting structure (11) may be shared and cooperative with the components of the skinning machine. The skinning machine comprises means for removing a portion of hide from the back (352) of the carcass (30), such as, for example, an extractor arm capable of engaging a portion of hide partially removed from the back (352) and making an upward movement to remove a remaining portion of hide present on the back (352) of the carcass (30), while the carcass (30) is firmly fastened by the restraint device (13).

The invention also proposes a method for stabilizing a suspended carcass (30), the method including a stage of applying a restraint device (13) having restraining means (130) to exert a first contact with the head (31) and a second contact with the neck (32), the second contact being exerted exclusively with at least one part of the rear portion (32b) of the neck (32).

The preferred or alternative embodiments described herein do not have the weight of limiting the present invention to the structural forms, and there may be constructive variations that are equivalent without, however, straying from the scope of protection of the invention.

The invention claimed is:

1. A restraint apparatus for stabilizing a suspended carcass, the carcass having a head and a neck, the neck comprising a peripheral region which is divided into a front portion and a rear portion, the restraint apparatus comprising a supporting structure, a mobile arm relative to the supporting structure and a restraint device fastened on the arm, wherein the restraint device comprises restraining means configured to, in use, exert a first contact with the head and a second contact with the neck, the second contact being exclusive with at least one part of the rear portion of the neck.

2. The restraint apparatus according to claim 1, wherein the restraining means of the restraint device comprise a first contact surface and a second contact surface, the contact surfaces defining together an opening angle and being configured to exert the second contact with the neck of the carcass.

3. The restraint apparatus according to claim 2, wherein the opening angle between the first contact surface and the second contact surface is between 30° and 50°.

4. The restraint apparatus according to claim 2, wherein restraint apparatus comprises a guide surface suitable for guiding the neck towards the first and second contact surfaces of the restraint device.

5. The restraint apparatus according to claim 1, wherein restraining means of the restraint device comprise a third contact surface configured to exert the first contact with the head of the carcass.

6. The restraint apparatus according to claim 5, wherein restraint device comprises a plate fixed on the arm, the plate having an edge, a bottom surface and a top surface, and the first and the second contact surfaces are defined by at least one part of the edge of the plate, and the third contact surface is defined by at least one part of the bottom surface of the plate.

7. The restraint apparatus according to claim 6, wherein first contact surface and the second contact surface correspond, respectively, to a first leg and to a second leg of a V-shaped cut present on the plate.

8. The restraint apparatus according to claim 1, wherein the arm, in use, develops a movement between a rest position, in which the restraint device is moved away from the carcass, and a working position, in which the restraint device is operative on the carcass.

9. The restraint apparatus according to claim 8, wherein the movement of the arm from the rest position to the working position is carried out so as to result in downward movement on the restraint device.

10. The restraint apparatus according to claim 1, wherein the arm is articulated around an articulation axis.

11. The restraint apparatus according to claim 10, wherein the arm is articulated by actuation of an articulation cylinder.

12. The restraint apparatus according to claim 1, wherein the arm is fastened on a movement assembly fastened on the supporting structure and in that the arm has an adjustable height relative to the supporting structure.

13. The restraint apparatus according to claim 1, wherein restraint apparatus comprises a cleaning assembly having at least one water duct equipped with a plurality of spray nozzles directed to spray water against the restraint device.

14. A skinning machine, characterized by comprising a restraint apparatus for stabilizing a suspended carcass as defined in claim 1.

15. A method for stabilizing a suspended carcass, the carcass having a head and a neck, the neck comprising a peripheral region which is divided into a front portion and a rear portion, the method including a stage of applying a restraint device having restraining means to exert a first contact with the head and a second contact with the neck, the second contact being exerted exclusively with at least one part of the rear portion of the neck.

* * * * *